US009743798B2

(12) United States Patent
Fu et al.

(10) Patent No.: US 9,743,798 B2
(45) Date of Patent: *Aug. 29, 2017

(54) DISPOSABLE SINGLE USE BEVERAGE PACKAGE

(71) Applicant: LBP MANUFACTURING, INC., Cicero, IL (US)

(72) Inventors: Thomas Z. Fu, Naperville, IL (US); Matthew R. Cook, Oak Brook, IL (US)

(73) Assignee: LBP MANUFACTURING LLC, Cicero, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/534,871

(22) Filed: Nov. 6, 2014

(65) Prior Publication Data
US 2015/0064311 A1    Mar. 5, 2015

Related U.S. Application Data

(63) Continuation of application No. 13/191,219, filed on Jul. 26, 2011, now Pat. No. 9,108,794, which is a (Continued)

(51) Int. Cl.
*A47G 19/14*    (2006.01)
*A47J 31/06*    (2006.01)
(Continued)

(52) U.S. Cl.
CPC ............... *A47J 31/06* (2013.01); *A47J 31/08* (2013.01); *A47J 31/368* (2013.01); *A47J 31/407* (2013.01);
(Continued)

(58) Field of Classification Search
CPC   A47J 31/06; A47J 31/08; A47J 31/368; A47J 31/407; A47J 31/46; B01D 35/02;
(Continued)

(56) References Cited

U.S. PATENT DOCUMENTS 2,224,378 A    12/1940   Coniglio
2,224,409 A    12/1940   Schleyer
(Continued)

FOREIGN PATENT DOCUMENTS

CA    2010954 A1    8/1991
CN    2425039 Y     3/2001
(Continued)

OTHER PUBLICATIONS

Official Final Action by the United States Patent & Trademark Office, dated Jan. 27, 2015, in the parent U.S. Appl. No. 12/889,144, filed Sep. 23, 2010, (20 pages).

(Continued)

*Primary Examiner* — Quang D Thanh
*Assistant Examiner* — Brandon Harvey
(74) *Attorney, Agent, or Firm* — Dinsmore & Shohl LLP

(57) ABSTRACT

A beverage brewer having a cartridge for placement of a disposable single use filter basket filled with beverage grounds. The filter basket includes a plastic frame having a bottom, a plurality of ribs, and a top rim that define a plurality of openings covered by a non-woven or woven plastic filter material. The basket filled with beverage grounds is enclosed with a film cover. The inlet probe of the brewer pierces the cover and admits a heated liquid into the beverage grounds, and creates a brewed beverage that flows through the filter material and exits an opening in a bottom portion of the cartridge.

19 Claims, 15 Drawing Sheets

Related U.S. Application Data continuation-in-part of application No. 12/889,144, filed on Sep. 23, 2010, now Pat. No. 9,527,661.

(60) Provisional application No. 61/246,796, filed on Sep. 29, 2009.

(51) Int. Cl.
*A47J 31/08* (2006.01)
*A47J 31/36* (2006.01)
*B65D 85/804* (2006.01)
*A47J 31/40* (2006.01)
*A47J 31/46* (2006.01)
*B01D 35/02* (2006.01)
*B01D 39/16* (2006.01)
*B65D 65/46* (2006.01)

(52) U.S. Cl.
CPC .............. *A47J 31/46* (2013.01); *B01D 35/02* (2013.01); *B01D 39/16* (2013.01); *B65D 65/466* (2013.01); *B65D 85/8043* (2013.01); *B65D 85/8046* (2013.01); *Y02W 90/14* (2015.05); *Y10T 29/49826* (2015.01)

(58) Field of Classification Search
CPC .... B01D 29/13; B01D 29/014; B01D 29/016; B01D 29/07; B01D 29/071; B01D 35/027; B01D 39/16; B01D 39/1607; B01D 39/18; B65D 85/8043; B65D 85/8046; Y02W 90/14
USPC ................. 99/295, 317, 323; 210/464, 469, 210/473–483
See application file for complete search history.

(56) References Cited

U.S. PATENT DOCUMENTS

| | | |
|---|---|---|
| 2,743,664 A | 5/1956 | Dale |
| 2,885,290 A | 5/1959 | Krasker |
| 2,968,560 A | 1/1961 | Goros |
| 3,483,812 A | 12/1969 | Gast |
| 3,592,126 A | 7/1971 | Dombrowik |
| 3,811,373 A | 5/1974 | Telco |
| 3,935,112 A | 1/1976 | Greutert |
| 4,052,318 A | 10/1977 | Krebs |
| 4,130,622 A * | 12/1978 | Pawlak ................ B01D 29/111 210/484 |
| 4,271,024 A | 6/1981 | Kawolics et al. |
| 4,382,861 A | 5/1983 | Adeboi et al. |
| D270,513 S | 9/1983 | Wallsten |
| 4,471,689 A | 9/1984 | Piana |
| 4,522,298 A | 6/1985 | Weinberger |
| 4,626,435 A | 12/1986 | Zimmerman |
| 4,756,915 A | 7/1988 | Dobry |
| 4,832,845 A | 5/1989 | Hendretti |
| 4,859,337 A | 8/1989 | Woltermann |
| 4,882,055 A | 11/1989 | Stamstad |
| 4,886,674 A | 12/1989 | Seward |
| 5,011,023 A | 4/1991 | Arai |
| 5,012,629 A | 5/1991 | Rehman |
| 5,082,676 A | 1/1992 | Love |
| 5,108,768 A | 4/1992 | So |
| 5,125,327 A | 6/1992 | Winnington-Ingram |
| 5,197,374 A | 3/1993 | Fond |
| 5,207,341 A | 5/1993 | Yeager |
| 5,243,164 A | 9/1993 | Erickson |
| 5,266,194 A | 11/1993 | Chiodo |
| 5,277,103 A | 1/1994 | Cox |
| 5,298,267 A | 3/1994 | Gruenbacher |
| 5,325,765 A | 7/1994 | Sylvan et al. |
| D349,211 S | 8/1994 | Cerato |
| 5,347,916 A | 9/1994 | Fond |
| 5,424,083 A | 6/1995 | Lozito |
| 5,520,093 A | 5/1996 | Ackermann |
| 5,605,710 A | 2/1997 | Pridonoff |
| 5,633,026 A | 5/1997 | Gruenbacher |
| 5,637,335 A | 6/1997 | Fond |
| 5,738,786 A * | 4/1998 | Winnington-Ingram ................ A47G 19/16 206/5 |
| 5,758,473 A | 6/1998 | Patelli |
| 5,776,527 A | 7/1998 | Blanc |
| 5,840,189 A | 11/1998 | Sylvan et al. |
| D408,679 S | 4/1999 | Britt |
| 5,895,672 A | 4/1999 | Cooper |
| 5,948,455 A | 9/1999 | Schaeffer |
| 5,967,019 A | 10/1999 | Johnson |
| 6,076,450 A | 6/2000 | DiGiorgio, Jr. |
| 6,079,315 A | 6/2000 | Beaulieu et al. |
| 6,082,247 A | 7/2000 | Beaulieu |
| 6,142,063 A | 11/2000 | Beaulieu |
| 6,182,554 B1 | 2/2001 | Beaulieu et al. |
| 6,283,013 B1 | 9/2001 | Romandy |
| D452,433 S | 12/2001 | Lazaris |
| D452,434 S | 12/2001 | Sweeney |
| 6,440,256 B1 | 8/2002 | Gordon et al. |
| D462,865 S | 9/2002 | Honan |
| 6,485,766 B2 | 11/2002 | Herod |
| 6,517,880 B2 | 2/2003 | Walters, Jr. et al. |
| D474,110 S | 5/2003 | Sweeney |
| D474,111 S | 5/2003 | Lazaris |
| 6,589,577 B2 | 7/2003 | Lazaris et al. |
| 6,606,938 B2 * | 8/2003 | Taylor ..................... A47J 31/32 426/433 |
| 6,607,762 B2 | 8/2003 | Lazaris et al. |
| 6,644,173 B2 | 11/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,662,955 B1 | 12/2003 | Lassota |
| 6,666,130 B2 | 12/2003 | Taylor et al. |
| 6,672,200 B2 | 1/2004 | Duffy |
| 6,708,600 B2 | 3/2004 | Winkler et al. |
| D489,215 S | 5/2004 | Honan |
| 6,740,345 B2 | 5/2004 | Cai |
| 6,758,130 B2 | 7/2004 | Sargent |
| D494,811 S | 8/2004 | Rossi |
| 6,777,007 B2 | 8/2004 | Cai |
| 6,786,134 B2 | 9/2004 | Green |
| 6,810,788 B2 | 11/2004 | Hale |
| 6,844,015 B2 | 1/2005 | Yuguchi |
| D502,362 S | 3/2005 | Lazaris et al. |
| 6,861,086 B2 | 3/2005 | Buckingham |
| 6,948,420 B2 | 9/2005 | Kirschner |
| D513,572 S | 1/2006 | Schaffeld |
| 7,081,263 B2 | 7/2006 | Albrecht |
| 7,165,488 B2 | 1/2007 | Bragg et al. |
| 7,213,506 B2 | 5/2007 | Halliday |
| D544,299 S | 6/2007 | Schaffeld |
| 7,311,037 B2 | 12/2007 | Albrecht |
| D564,832 S | 3/2008 | Bodum |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter |
| 7,412,921 B2 | 8/2008 | Hu |
| 7,490,542 B2 | 2/2009 | Macchi |
| 7,513,192 B2 | 4/2009 | Sullivan et al. |
| 7,523,695 B2 | 4/2009 | Streeter |
| 7,543,527 B2 | 6/2009 | Schmed |
| 7,552,672 B2 | 6/2009 | Schmed |
| 7,624,673 B2 | 12/2009 | Zanetti |
| 7,640,845 B2 | 1/2010 | Woodnorth |
| 7,836,819 B2 | 11/2010 | Suggi Liverani et al. |
| D637,484 S | 5/2011 | Winkler |
| 8,039,029 B2 | 10/2011 | Ozanne |
| 8,039,034 B2 | 10/2011 | Ozanne |
| 8,221,813 B2 | 7/2012 | Boul |
| 2002/0144603 A1 | 10/2002 | Taylor |
| 2004/0045443 A1 | 3/2004 | Lazaris et al. |
| 2004/0115317 A1 | 6/2004 | Doglioni |
| 2004/0118295 A1 | 6/2004 | Angeles |

(56) References Cited

U.S. PATENT DOCUMENTS

| | | |
|---|---|---|
| 2004/0149135 A1 | 8/2004 | Cai |
| 2004/0159075 A1 | 8/2004 | Matthews |
| 2004/0182250 A1* | 9/2004 | Halliday ............ A47J 31/4407 99/279 |
| 2005/0051478 A1 | 3/2005 | Karanikos et al. |
| 2005/0056153 A1 | 3/2005 | Nottingham et al. |
| 2005/0115414 A1 | 6/2005 | Yuguchi |
| 2005/0205601 A1 | 9/2005 | Taylor |
| 2005/0266122 A1 | 12/2005 | Franceschi |
| 2005/0287251 A1 | 12/2005 | Lazaris et al. |
| 2006/0021930 A1 | 2/2006 | Cai et al. |
| 2006/0057257 A1 | 3/2006 | Ma |
| 2006/0099393 A1 | 5/2006 | Woodman et al. |
| 2006/0169149 A1 | 8/2006 | Voss |
| 2006/0174773 A1 | 8/2006 | Taylor |
| 2006/0230944 A1 | 10/2006 | Neace et al. |
| 2006/0236871 A1 | 10/2006 | Ternite |
| 2006/0292012 A1 | 12/2006 | Brudevold |
| 2007/0000390 A1 | 1/2007 | Albrecht |
| 2007/0056994 A1 | 3/2007 | Woodnorth et al. |
| 2007/0089614 A1 | 4/2007 | Tremblay |
| 2007/0125238 A1 | 6/2007 | Urquhart et al. |
| 2007/0221066 A1 | 9/2007 | Sullivan et al. |
| 2008/0060751 A1 | 3/2008 | Arrindell |
| 2008/0095904 A1 | 4/2008 | Sullivan et al. |
| 2008/0115674 A1 | 5/2008 | Huang et al. |
| 2008/0134902 A1 | 6/2008 | Zimmerman et al. |
| 2008/0251518 A1 | 10/2008 | Tee |
| 2008/0264267 A1 | 10/2008 | Doglioni Majer |
| 2009/0007792 A1 | 1/2009 | Glucksman et al. |
| 2009/0056557 A1 | 3/2009 | Lin |
| 2009/0173043 A1 | 7/2009 | Bloome |
| 2009/0229470 A1 | 9/2009 | Dorfmueller |
| 2009/0260521 A1 | 10/2009 | Tatsuno |
| 2010/0024658 A1 | 2/2010 | Jacobs |
| 2010/0028495 A1 | 2/2010 | Novak |
| 2010/0043644 A1 | 2/2010 | Suggi Liverani et al. |
| 2010/0043645 A1 | 2/2010 | Suggi Liverani et al. |
| 2010/0043646 A1 | 2/2010 | Suggi Liverani et al. |
| 2010/0077928 A1 | 4/2010 | Schmed |
| 2010/0093245 A1 | 4/2010 | Bradley et al. |
| 2010/0282091 A1 | 11/2010 | Doleac |
| 2010/0288131 A1 | 11/2010 | Kilber |
| 2010/0288133 A1 | 11/2010 | Litzka |
| 2010/0303964 A1 | 12/2010 | Beaulieu et al. |
| 2010/0320206 A1 | 12/2010 | Caldwell et al. |
| 2011/0030563 A9 | 2/2011 | Doglioni Majer |
| 2011/0064852 A1 | 3/2011 | Mann |
| 2011/0070384 A1 | 3/2011 | Bentley |
| 2011/0070385 A1 | 3/2011 | Jahani |
| 2011/0073607 A1 | 3/2011 | Fu et al. |
| 2011/0076361 A1 | 3/2011 | Peterson |
| 2011/0127319 A1 | 6/2011 | Golden |
| 2011/0142996 A1 | 6/2011 | Kruger |
| 2011/0151075 A1 | 6/2011 | Peterson |
| 2011/0168029 A1 | 7/2011 | Fulco |
| 2011/0183043 A1 | 7/2011 | Reati |
| 2011/0185911 A1 | 8/2011 | Rapparini |
| 2011/0226343 A1 | 9/2011 | Novak |
| 2012/0058226 A1 | 3/2012 | Winkler |

FOREIGN PATENT DOCUMENTS

| | | |
|---|---|---|
| CN | 2727099 Y | 9/2005 |
| CN | 2727099 Y | 9/2005 |
| FR | 2213757 A1 | 8/1974 |
| GB | 1348370 | 3/1974 |
| JP | S56-000664 U1 | 1/1981 |
| JP | U1987-163040 | 1/1989 |
| JP | H06-113952 A | 4/1994 |
| JP | H08-244836 A | 9/1996 |
| JP | H09-000451 A | 1/1997 |
| JP | 2004-500199 | 1/2004 |
| JP | 3141054 U | 4/2008 |
| JP | 2009011420 A | 1/2009 |
| WO | 9307791 A1 | 4/1993 |
| WO | WO0160712 | 8/2001 |
| WO | WO2005026018 | 3/2005 |
| WO | 2008029265 A2 | 3/2008 |
| WO | WO2009006374 | 1/2009 |

OTHER PUBLICATIONS

First, Second, and Third official action by the Canadian Intellectual Property Office, dated Feb. 11, 2013, Jul. 23, 2014, and Oct. 8, 2014 respectively, for related pending Canadian Patent Application No. 2,776,150, filed Sep. 28, 2010, (8 pages).

My K-Cup: Keurig Single-Cup Coffee Headquarters—Coffee, Brewers, and Accessories, Jul. 26, 2006, (retrieved by the Canadian Patent Examiner on Jan. 5, 2014 from www.mykcup.com, (2 pages).

Official Action, dated Mar. 6, 2013, for corresponding Singapore Application No. 201202280-2 (4 pages).

Official Action, dated Sep. 16, 2014, for corresponding Japanese Application No. 2012-532233 (7 pages).

International Search Report & Written Opinion, dated Jan. 8, 2013, for International Application No. PCT/US2012/047835 (13 pages).

Plastic coffee ground basket with metal mesh and holder for same, available prior to earliest filing date of U.S. Appl. No. 12/889,144, from Breville Brewer (2 pages).

International Search Report & Written Opinion, dated Dec. 11, 2012, for International Application No. PCT/US2012/55910 (10 pages).

International Search Report & Written Opinion, dated Nov. 19, 2010, for International Application No. PCT/US2010/050505 (7 pages).

Definitions of "bond" & "bonded" from dictionary.com, printed Jul. 10, 2014 (2 pages).

Official Action (English translation not available) dated Jul. 17, 2015 for corresponding Chinese Patent Application No. 201280052073.4 (12 pages).

Official Action issued in related U.S. Appl. No. 14/716,592, mailed Aug. 23, 2016.

Official Action issued in related U.S. Appl. No. 14/716,592, mailed Apr. 7, 2016.

Advisory Action issued in related U.S. Appl. No. 14/716,592, mailed Feb. 24, 2016.

Official Action issued in related U.S. Appl. No. 14/716,592, mailed Aug. 17, 2015.

Official Action issued in related U.S. Appl. No. 14/716,592, mailed Nov. 17, 2015.

Official Action issued in U.S. Appl. No. 13/624,169, mailed Jan. 15, 2016.

Official Action issued in U.S. Appl. No. 13/624,169, mailed Jun. 10, 2015.

Official Action issued in U.S. Appl. No. 12/889,144, mailed Aug. 18, 2015.

Official Action issued in U.S. Appl. No. 12/889,144, mailed Jan. 27, 2015.

Official Action issued in U.S. Appl. No. 12/889,144, mailed Nov. 20, 2014.

Advisory Action issued in U.S. Appl. No. 12/889,144, mailed Aug. 1, 2014.

Advisory Action issued in U.S. Appl. No. 12/889,144, mailed Jul. 24, 2014.

Official Action issued in U.S. Appl. No. 12/889,144, mailed Jul. 11, 2014.

Official Action issued in U.S. Appl. No. 12/889,144, mailed Mar. 24, 2014.

Official Action issued in U.S. Appl. No. 12/889,144, mailed Dec. 9, 2013.

Official Action issued in U.S. Appl. No. 12/889,144, mailed Jul. 3, 2013.

Official Action issued in U.S. Appl. No. 12/889,144, mailed Nov. 6, 2012.

Official Action issued in U.S. Appl. No. 12/889,144, mailed Jun. 18, 2012.

(56) References Cited

OTHER PUBLICATIONS

Official Action issued in U.S. Appl. No. 12/889,144, mailed Aug. 23, 2016.
Official Action issued in U.S. Appl. No. 12/889,144, mailed Mar. 15, 2016.
Official Communication issued in corresponding EP Appln. No. 12833059.4, dated Jun. 24, 2016.
Chinese 3rd Official Action, issued in corresponding CN Appln. No. 201280046959.8, dated Dec. 20, 2016.

* cited by examiner

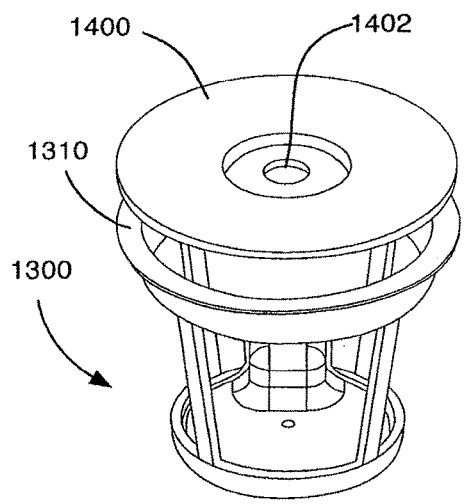
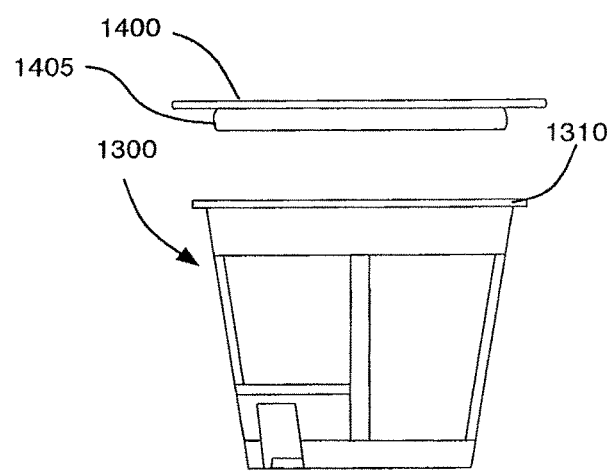
FIG. 14A  FIG. 14B
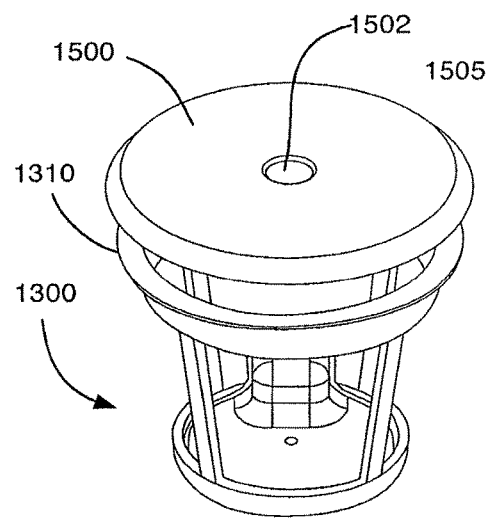
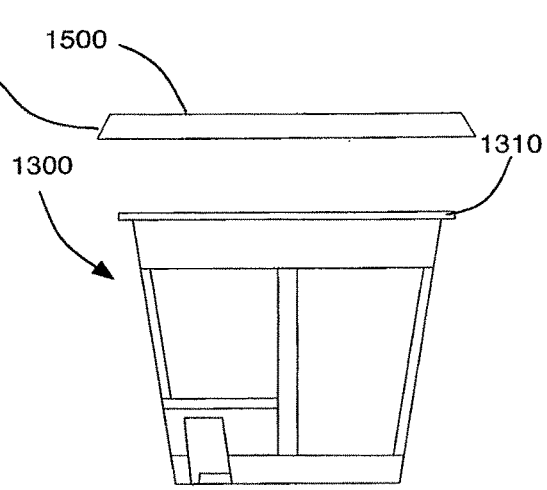
FIG. 15A  FIG. 15B

DISPOSABLE SINGLE USE BEVERAGE PACKAGE

CROSS-REFERENCE TO RELATED APPLICATIONS

This application is a continuation of U.S. application Ser. No. 13/191,219, filed Jul. 26, 2011 (pending), which is a continuation-in-part of U.S. application Ser. No. 12/889,144, filed Sep. 23, 2010 (pending), which claims the benefit of U.S. Provisional Application No. 61/246,796, filed Sep. 29, 2009, the disclosures of which are incorporated by reference in their entireties.

BACKGROUND OF THE INVENTION

Single serve beverage brewing is popular among consumers. There are many formats of single serve brewers on the market. These brewers are designed to quickly brew a single cup of coffee or tea. The coffee or tea grounds are sold in prepared, single serving portions.

Reusable devices for single serve brewers, such as devices with metal or steel filters, may not suitable in some situations. For example, when efficiency is required such as in a busy home, in an office environment, or in a waiting-room environment. Reusable devices require cleaning, which may be complicated by the tendency of beverage grounds to cake into the filter openings. Additionally, to accommodate cleaning of reusable devices, the single serve brewer will be required to be placed near a source of water and a sink or drain. Provision of a sink or drain may be impracticable.

BRIEF SUMMARY OF THE INVENTION

A disposable single use beverage package. The package may include a barrier, which may be an impermeable barrier surrounding a basket, which may be a permeable single walled basket. The basket may include a frame and a filter medium. The basket may also include a lid. The basket may be provided preloaded with beverage grounds or may be loaded with beverage grounds during use.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

In another aspect, a disposable single use beverage package includes a frame. The frame includes a continuous rim that defines an opening at a top of the frame, a bottom portion that is closed, and a plurality of spaced apart ribs that extend from the rim to a peripheral edge of the bottom. The bottom portion, plurality of ribs and rim define a plurality of openings that facilitate fluid flow. The bottom portion defines a groove or indentation configured to cooperate with a complementary feature of a cartridge to control alignment of the basket within the cartridge In a further aspect, a disposable single use beverage package includes a frame. The frame includes a continuous rim that defines an opening at a top of the frame, a bottom portion that is closed, and a plurality of spaced apart ribs that extend from the rim to a peripheral edge of the bottom. The bottom portion, plurality of ribs and rim define a plurality of openings that facilitate fluid flow. The basket is tapered to facilitate stacking of multiple baskets. At least one rib includes a ledge positioned in a center region configured to limit an amount by which an upper basket is insertable into a lower basket to thereby define a space between respective bottoms of the upper basket and the lower basket.

BRIEF DESCRIPTION OF THE DRAWINGS

FIGS. 14A and 14B illustrate a first lid embodiment for covering the beverage basket of FIGS. 13A-13C.

FIGS. 15A and 15B illustrate a second lid embodiment for covering the beverage basket of FIGS. 13A-13C.

DETAILED DESCRIPTION OF THE INVENTION

Single serve beverage brewing is popular among consumers due to the convenience and flexibility that it provides. Many single serve beverage brewers have entered the market. Traditional brewers typically produce between four and twenty cups of beverage at a time. The beverage sits on a hot plate until it is consumed. As time passes, the taste of the beverage may decline. Single serve brewing allows a consumer to enjoy beverages, such as coffee and tea, in an efficient fashion and without a decline in the taste profile of the beverage.

Figure 1:
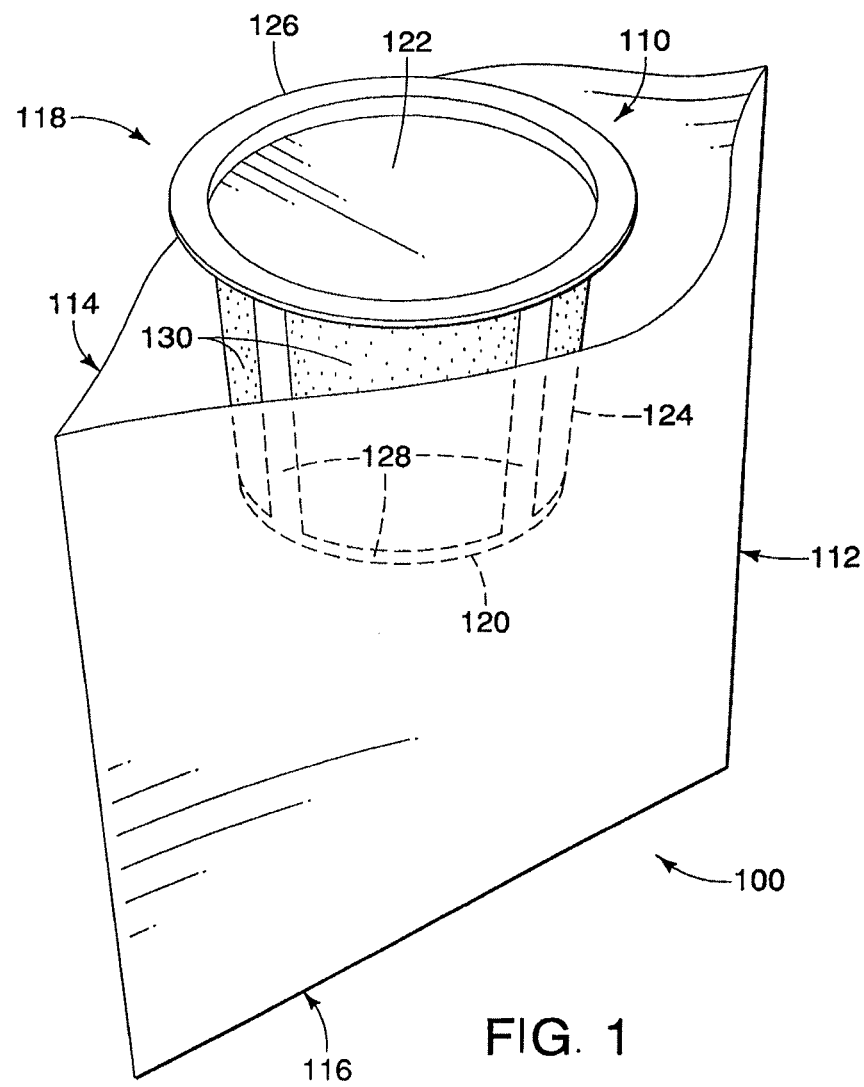
FIG. 1 illustrates a disposable beverage portion basket with packaging.

In FIG. 1, coffee or tea grounds for use in a single serving brewer may be packaged in a disposable single use beverage package 100. A disposable single use beverage package 100 may include a basket 110, which may be a permeable basket and barrier 112, which may be a disposable impermeable barrier.

The barrier 112 may have a first side 114 and a second side 116. The first side 114 may include a score, a tab, a zip, an embedded string, or otherwise provide a means for assisting a user to open the barrier 112. The barrier 112 may be sealed at the second side 116 or other sides by gusseting, pinching, heat sealing, stapling, or otherwise. Alternatively or additionally, the barrier 112 may be a shrink wrap barrier or a wax barrier, among others.

The barrier 112 may be substantially resistant to the passage of liquids, gases, and solids. For example, the barrier 112 may be hermetically sealed to block moisture and oxygen from entering the pouch and to retain the aroma of the coffee. Additionally or alternatively, several baskets may be prefilled and packaged together in an egg crate type configuration, a tube, or other packaging, to maintain freshness during shipping and storing. The barrier 112 may be made of materials such as foil laminate, metalized films, EVOH films, polyolefin based material, parafilm, plastics, and combinations of these, among others.

A user may open the package 100, for example, by tearing the barrier 112 along the first side 114 to reveal the basket 110. The user may remove the basket 110 from the barrier 112 and place the basket 110 into a single serve brewer. The basket 110 may be prefilled with grounds, or alternatively, the user may add grounds to the basket 110.

The basket 110 may be a single-wall permeable basket including a first end 118, which may be reversibly closed or an open end, and a second end 120, which may be a closed end. The basket 110 may be a cup shaped basket and may be used with a lid 122. The basket 110 may also have a side wall 124 and a rim 126. The side wall 124 may connect the second end 120 and the rim 126. The side wall 124 may include a frame 128 and a filter medium 130.

The frame 128 may provide structure, stability, and integrity to the filter medium 130. The frame 128 may be formed by injection molding or by a different process suitable for manufacturing a rigid form around a relatively flexible filter medium. The frame 128 may be made of any one of many commercially available materials, such as polystyrene, polyethylene, polypropylene, polyester, polyamide or Nylon, or other synthetic or natural plastics or combinations thereof. The frame may be made from other materials such as a bio-based polymer, such as polylaticacid (PLA), poly hydroxybutaric acid (PHA) or a starch based polymer. The frame 128 may be made of other materials known to those skilled in the art.

Figure 2:
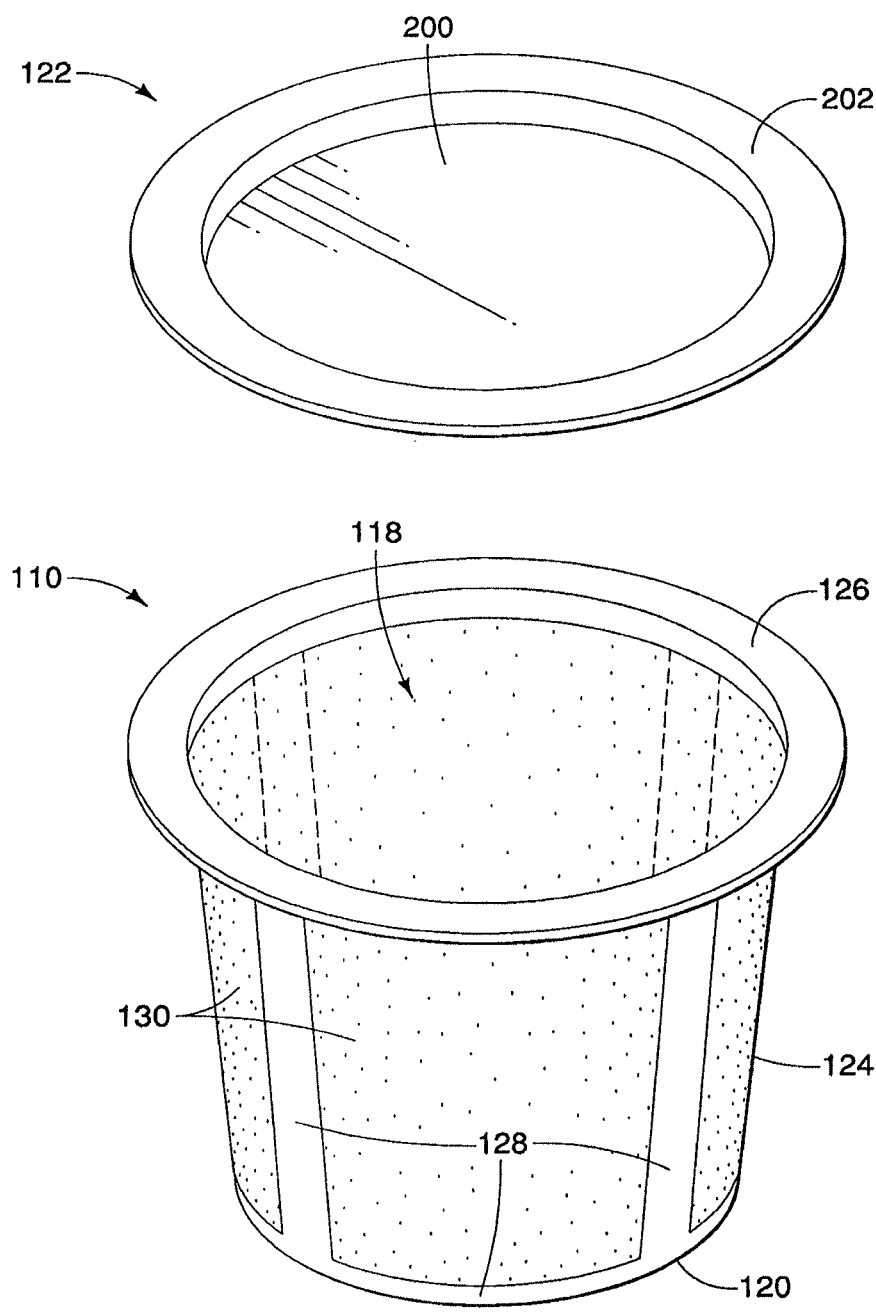
FIG. 2 illustrates a disposable beverage portion basket and lid.
Figure 7A:
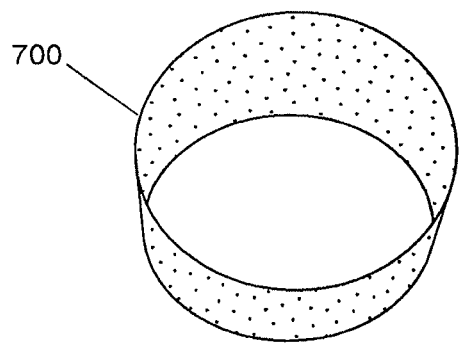
FIG. 7A illustrates an exemplary filter medium side portion configured to be molded into a basket.
Figure 7B:
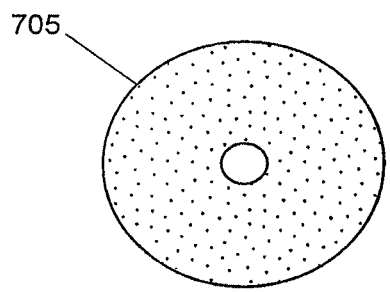
FIG. 7B illustrates an exemplary filter medium bottom portion, if needed, configured to be molded to a bottom surface of a frame of a basket.
Figure 7C:
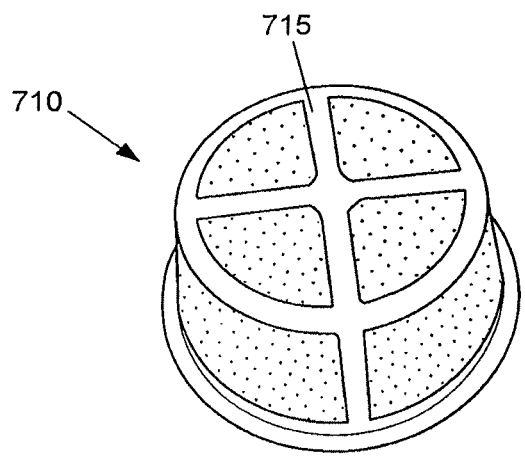
FIG. 7C illustrates an exemplary filter side portion and filter bottom portion molded to a basket.

In FIG. 2, the side walls 124 of the basket 110 may be defined by the frame 128 and a filter medium 130. The filter medium 130 may be secured to the basket 110, for example, at the second end 120, the rim 126, and/or at that frame 128. The filter medium 130 may be secured for example, by thermal bonding of the plastic used for the frame 128, or with an adhesive, by crimping, by heat sealing, or any other way. The filter medium 130 may be secured in the frame 128 in insert-injection molding of the plastic frame around a filter medium insert. For example, a pre-die cut blank of filter medium may be placed on a mandrel which has channels around the shape of the pre die-cut blank. Molten plastic may flow in and bond to the blank of the filter medium 130 during inert-injection molding. The plastic may solidify into the frame 128, for example, upon cooling. Referring to FIGS. 7A-7C, in an alternative embodiment the filter medium 700 and 705 may be first formed into a generally cylindrical and tapered portion 700 and an optional bottom circular filter medium 705 herein after referred to as the circular portion 705. The filter medium 700 and 705 may then be placed or inserted onto a mold for insert injection molding to form the basket 710 with the filter media 700 and 705 supported by the frame of the basket 710. The bottom end 715 of the frame of the basket 710 may be substantially open and a circular filter portion 705 may cover the open portions.

The filter medium 130 may be a porous material and may be permeable to liquids and some oils. It may be formed of many materials, for example, non-woven materials such as polystyrene, polyethylene, polypropylene, polylactic acid, cellulosic fibers, polyhydroxyalkanoates, thermoplastic starch, filter paper, other paper materials, polymer materials, a combination of these or any other material. The filter medium 130 may also be formed from a polymer or plastic filtration mesh, or microporous or apertured films made of various plastic materials, such as polypropylene, Nylon 6 and high density polyethylene or other materials known to those skilled in the art. Alternatively, the filter medium 130 may be formed from a bio-based polymer, such as polylatic acid (PLA), poly hydroxybutaric acid (PHA) or starch based polymer.

Characteristics of the filter medium 130 may be selected to meet the filtration needs of different products, such as ground coffee, tea powders or leaves, or other brewed products. For example, the basis weight, thickness, strand count, mesh size, flow rate and strength of the filter medium 130 may be selected based on the product to be brewed.

The filter medium 130 may be compostable, biodegradable, recycled, and/or recyclable. If the filter medium 130 is a non-woven material, it may have a greater resistance than, for example, a woven material or a metal filter. A non-woven filter medium 130 may retain water in the basket for longer than, for example, a woven or metal filter. The length of time that the water is retained in the basket with the grounds may influence the strength and therefore the taste profile of the resulting beverage. This may be because a woven material or a metal material may have technological limitations on the size of the openings there through. A non-woven material may not have the same technological limitations. Therefore, the difference may be that, in a woven material or metal material, the path of the water may be straight through the wall and in the non-woven material, the path may be indirect and convoluted.

The basket 110 may include a lid 122. The lid 122 may include a rim 202 and a cover 200. The cover 200 may be disposed below the rim 202 for secure fitting with the basket 110. Alternatively, the cover 200 may not include a rim 202. The cover 200 may be made from a material that may be punctured to allow a liquid to enter into the basket. For example, the cover 200 may be a material, such as a foil, film, coated film, or multilayer laminate, which is sealed to or across the rim 126 of the permeable basket 110 to maintain contents therein. The cover 200 may keep dry contents dry, wet contents wet, and may maintain a freshness of the contents. The cover 200 may be formed of a plastic, metallic foil, filter material, thermoplastic starch, or a laminate or composite thereof.

Figure 3:
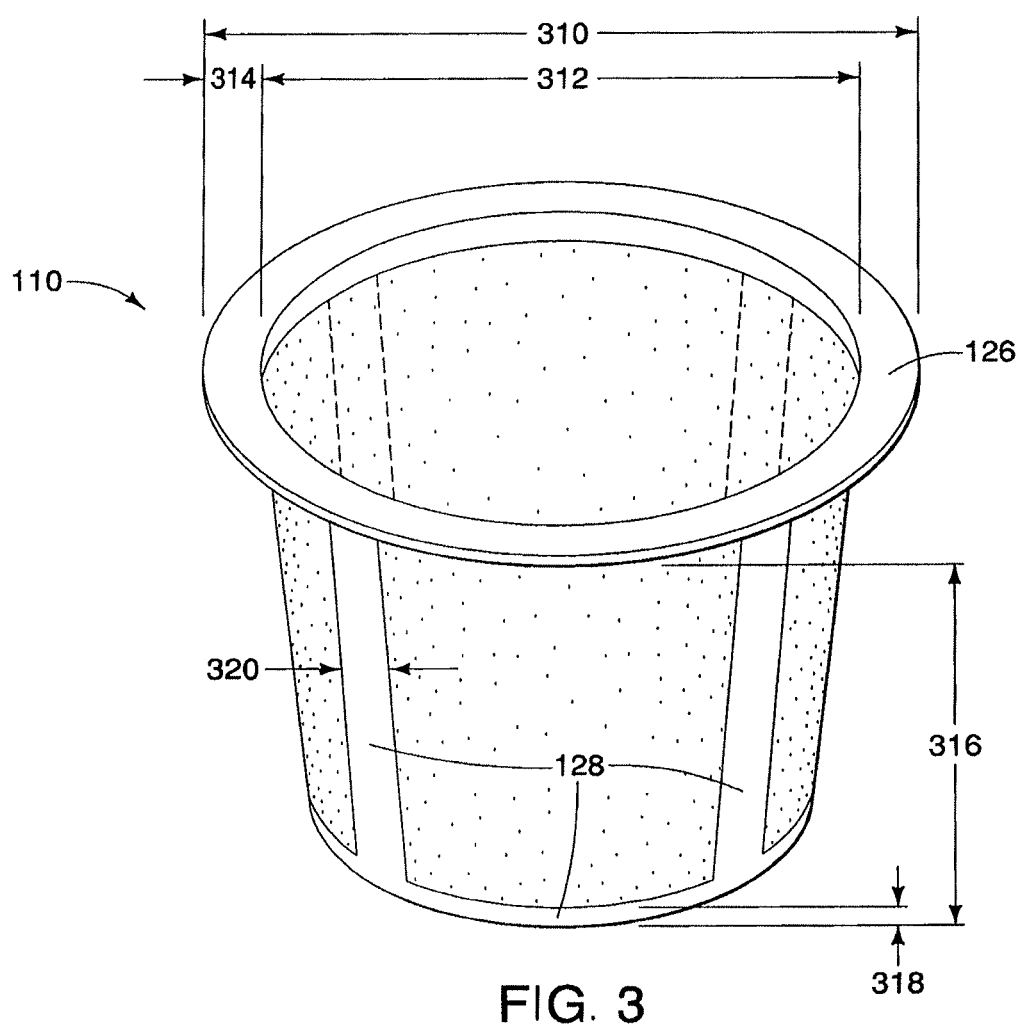
FIG. 3 illustrates a disposable beverage portion basket with exemplary dimensions.

The basket 110 may be dimensioned for use with a commercial single serve coffee brewer. FIG. 3 shows an exemplary basket 110. The basket 110 may have width of the open end 312, and a height 316. The open end 312 may be, for example but not limited to, about 38-42 mm. The height 316 may be, for example but not limited to, 38-42 mm. The rim 126 may have a dimension 314 of, for example but not limited to, 3.5-5.5 mm. The frame 128 may have a dimension 320 of, for example but not limited to, 5 mm, and a dimension 318 of, for example but not limited to 2 mm. These dimensions are merely exemplary and not limiting. The basket 110 may also have other dimensions or shapes, for example, dimensions that permit use in various single serve beverage machines.

Figure 4:
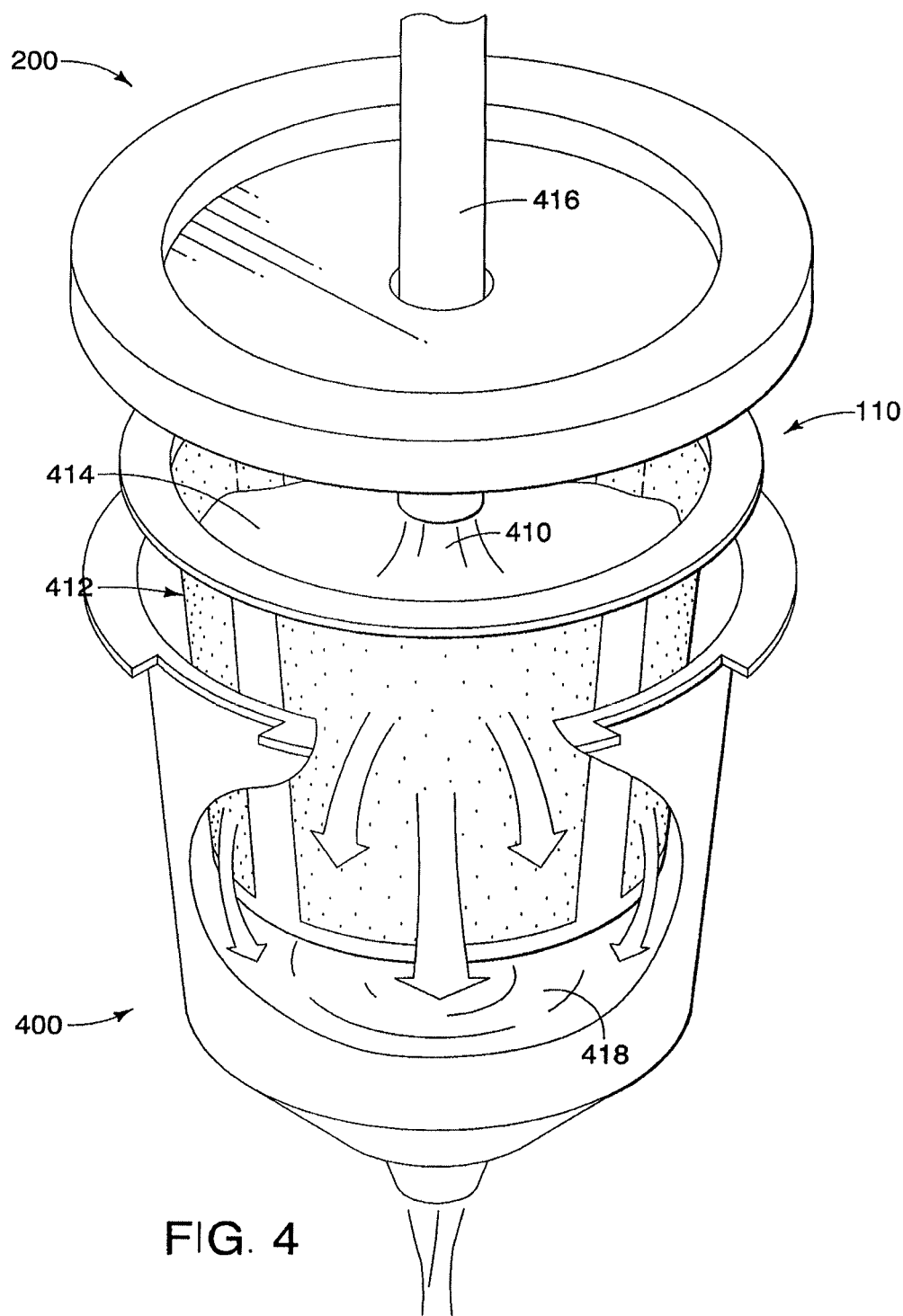
FIG. 4 illustrates use of a disposable beverage portion basket.

In FIG. 4, a basket 110 may be prefilled with beverage grounds 414, for example but not limited to, coffee or tea grounds. Alternatively or additionally, the basket 110 may be loaded with beverage grounds 414 immediately prior to use. If the basket 110 is prefilled with beverage grounds 414 it may be sealed with a lid 122. Alternatively, if the permeable basket 110 is not preloaded with beverage grounds 414, it may not have a lid 122, additionally or alternatively; it may have a removable lid 122, or otherwise.

During use, a user may open the barrier 112, take out the basket 110 and place the basket 110 into a single serve beverage machine. A heated liquid 410 may be received by the basket 110 through an opening in the cover 200 or otherwise. For example, during use, a preloaded basket 110 may be placed inside a cartridge 400 for a single serve beverage machine. The cartridge 400 may be reusable or disposable. During a brewing cycle, the cover 200 may be pierced by a probe 416 to admit heated liquid 410 into the basket 110. The heated liquid may interact with the beverage grounds 414 creating a beverage medium. The beverage medium 418 may flow through the filter medium 130 and exit through an opening in the cartridge 400.

As a second example, during use, an unloaded permeable basket 110 may be placed inside a cartridge 400 for a single serve beverage machine. The cartridge 400 may be reusable or disposable. The beverage grounds 414 may be placed into the basket 110. A cover 200 may be attached to maintain the contents of the basket 110. During a brewing cycle, the cover 200 may be pierced by a probe 416 to admit heated liquid 410 into the basket 110. The heated liquid may interact with the beverage grounds 414 creating a beverage medium. The beverage medium 414 may flow through the filter medium 130 and exit through an opening in the cartridge 400. Alternatively, no cover 200 may be required. In this case, the heated liquid 410 will flow directly into the basket 110.

Figure 5:
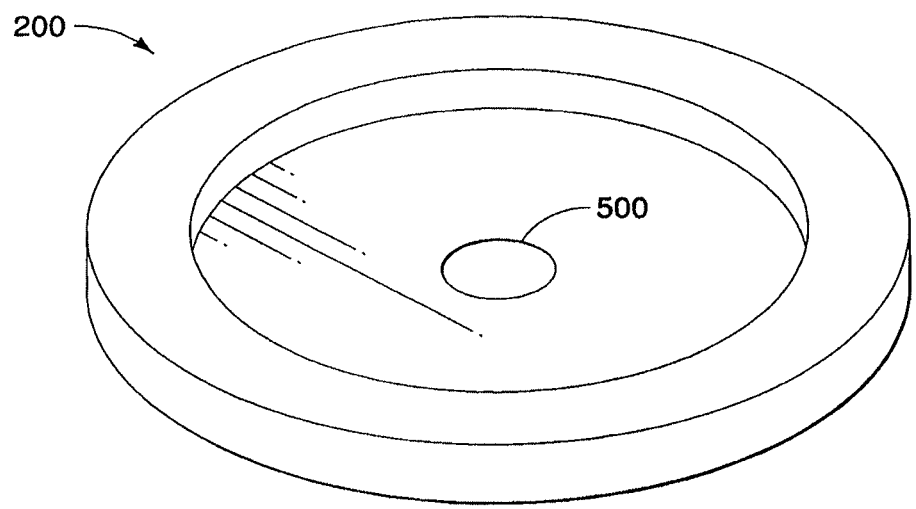
FIG. 5 illustrates an exemplary lid for a disposable beverage portion basket.

FIG. 5 illustrates one example of a lid 122 for a basket 110. The cover 200 of the lid 122 may include an opening 500 for entry of a liquid probe. The opening 500 may be a weakened portion of the material of the cover 200 which may give easily under the pressure of a probe.

Figure 6:
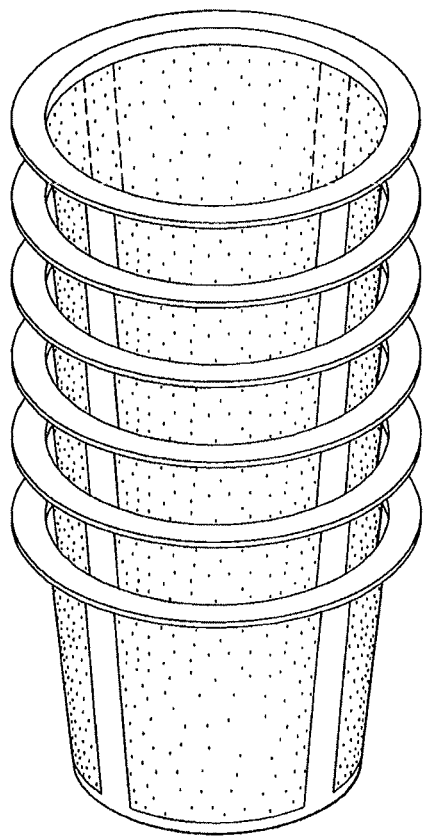
FIG. 6 illustrates an exemplary package of multiple disposable beverage portion baskets.

In FIG. 6, unloaded tapered baskets 110 may be configured for efficient nesting. The baskets 110 may be sold nested in a stack or tube, which may be packed in a sleeve of plastic film, or otherwise. The unloaded basket 110 may allow the end user to select a variety of beverage grounds 414 for use in their single serve brewer. The end user may also be able to modify the amount of beverage grounds 414 for use in their single serve brewer.

The components of the single use beverage package 100 may be selected with the intention of creating an environmentally friendly product. For example, the filter medium 130 may be made from a range of synthetic or biodegradable, recycled or recyclable, or compostable materials such as polyolefins, polylacticacid, cellulosics, polyhydroxylkanoates, thermoplastic starch, a combination of these or other materials. The basket frame 128 material, cover 200 and barrier 112 may also be made out of these materials or similar synthetic, biodegradable, recycled or recyclable, or compostable materials which retain the properties of structural integrity (e.g., frame 128) and impermeability (e.g., barrier 112).

Figure 8A:
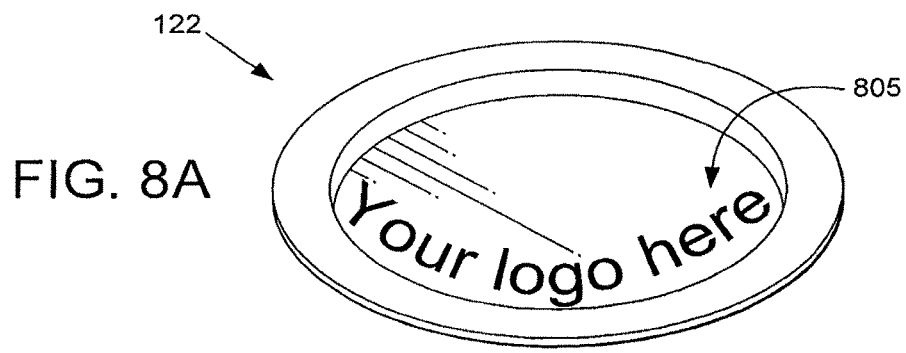
FIG. 8A illustrates the placement of a logo on the exemplary lid.
Figure 8B:
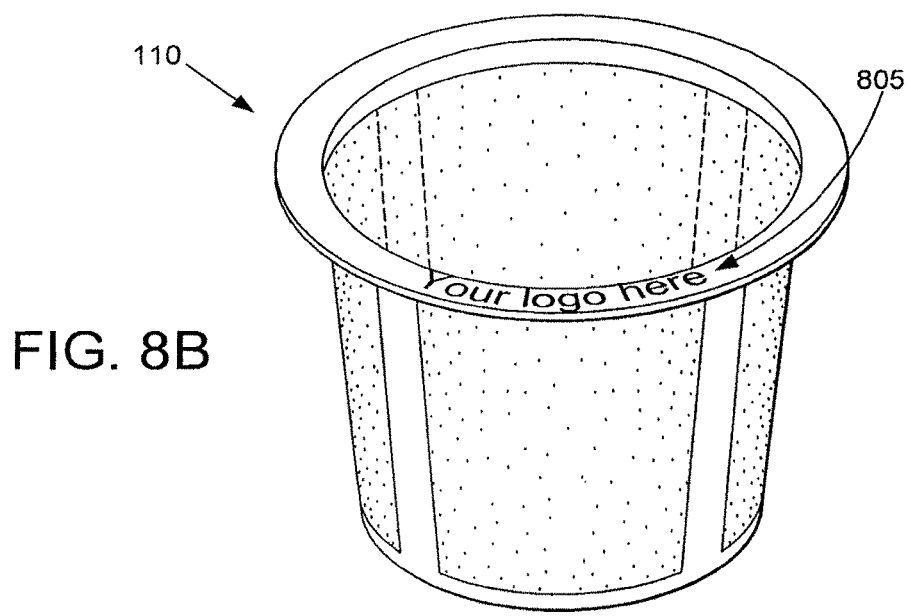
FIG. 8B illustrates the placement of a logo of the basket.
Figure 8C:
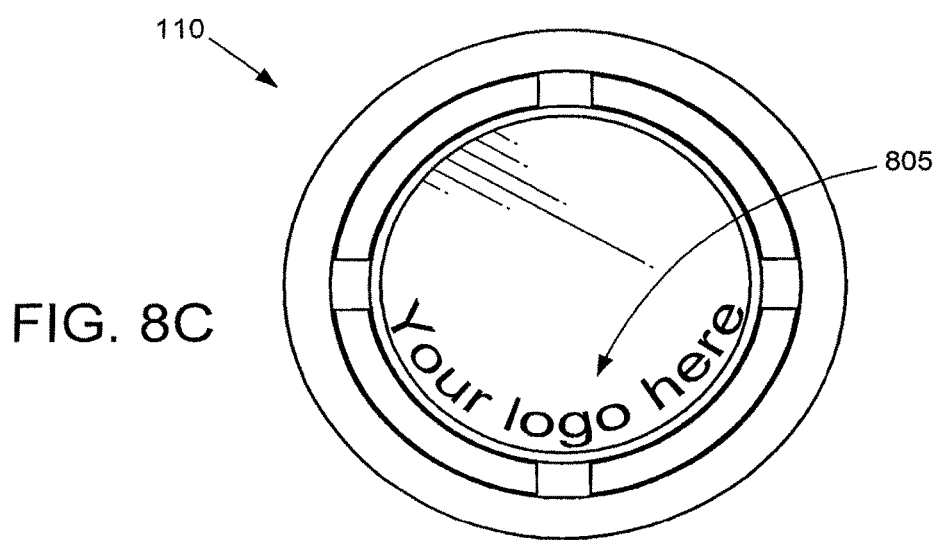
FIG. 8C illustrates the placement of a logo on underside of the basket.

While various embodiments of the embodiments have been described, it will be apparent to those of ordinary skill in the art that many more embodiments and implementations are possible that are within the scope of the claims. For example, referring to FIGS. 8A-8C, logos 805 of various configurations may be placed on the lid 122 (FIG. 9A), the basket 110 (FIG. 8B), or the underside of the basket 110. The logos 805 may also be printed on the filter medium 130. The logos 805 enable a vendor to, for example, place descriptive information about the product that is in the basket, such as whether the product is coffee or tea, a type of blend, and the like. Other information known to those skilled in the art may also be printed.

Figure 9A:
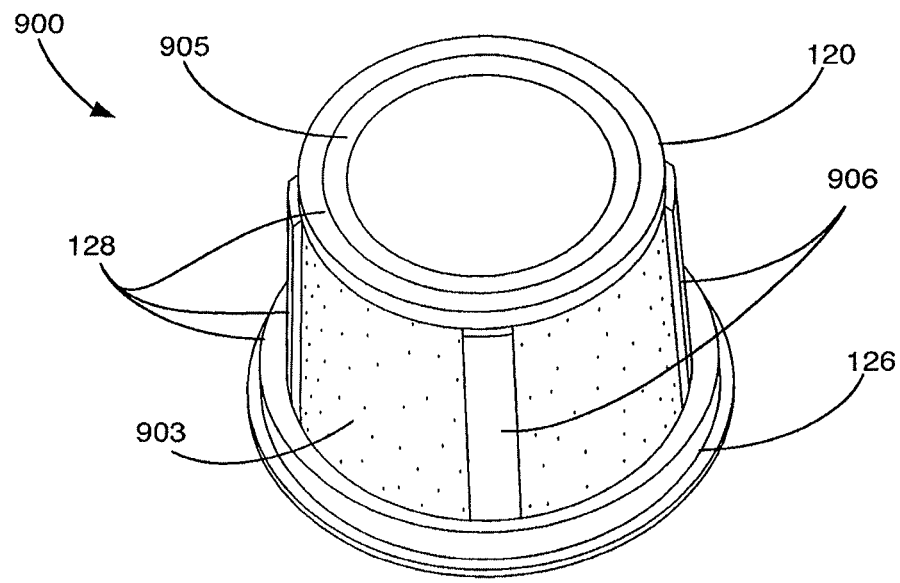
FIG. 9A illustrates a disposable beverage portion basket that defines a groove on a bottom portion.
Figure 9B:
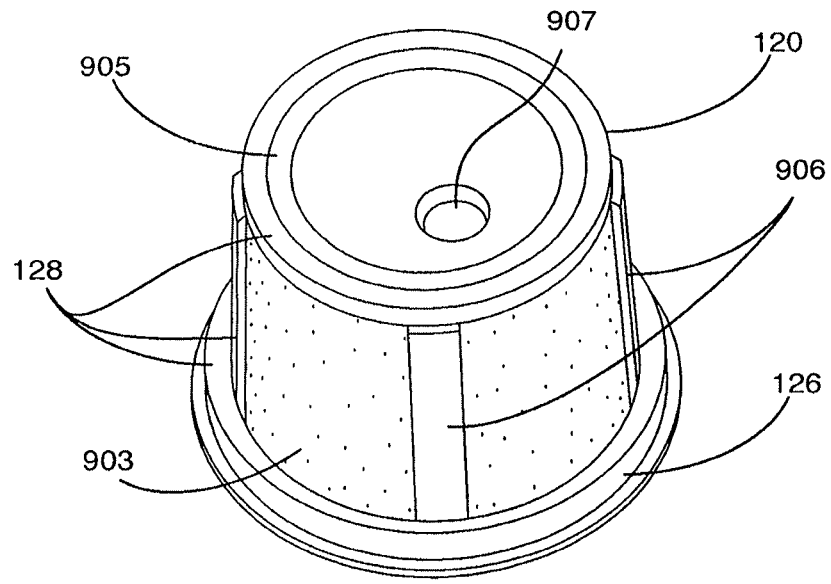
FIG. 9B illustrates a disposable beverage basket that defines a groove and indentation on a bottom portion.

FIGS. 9A and 9B illustrate yet other embodiments of disposable beverage baskets. FIG. 9A and FIG. 9B illustrate beverage basket embodiments configured to control the positioning of the basket within a cartridge or brewer. Referring to FIG. 9A, the beverage basket 900 (shown upside down) includes a frame 128 and filter material 903. The frame 128 includes a rim 126, a bottom portion 120, and a group of ribs 906. The rim 126 defines an opening that corresponds to the top of the frame 128 when the frame 128 is in an upright position. The rim 126 may be continuous and have a circular shape, oval shape, or a different shape. The bottom portion 120 is a closed surface that corresponds to the bottom of the frame 128. The ribs 906 extend from the rim 126 to the edge of the bottom portion 120. The ribs 906, rim 126, and bottom portion 120 define a group of openings that facilitate fluid flow, such as coffee, tea, or a different beverage.

The bottom portion 120 defines a groove 905 and/or an indentation 907 (See FIG. 9B). The groove 905 may extend in a continuous manner along and inward of the edge of the bottom portion 120. The groove 905 and/or indentation 907 are configured to cooperate with a complementary feature, e.g., a protruded needle in the bottom of a cartridge or brewer to accurately position the basket 900 within the cartridge or brewer. That is the groove 905 and/or indentation 907 are configured to mesh with a complementary feature of the cartridge or brewer to control alignment of the basket 900 so that the outer walls of the basket 900 are not up against inner walls of the cartridge or brewer during use, which could otherwise limit fluid flow through the basket 900.

Figure 10A:
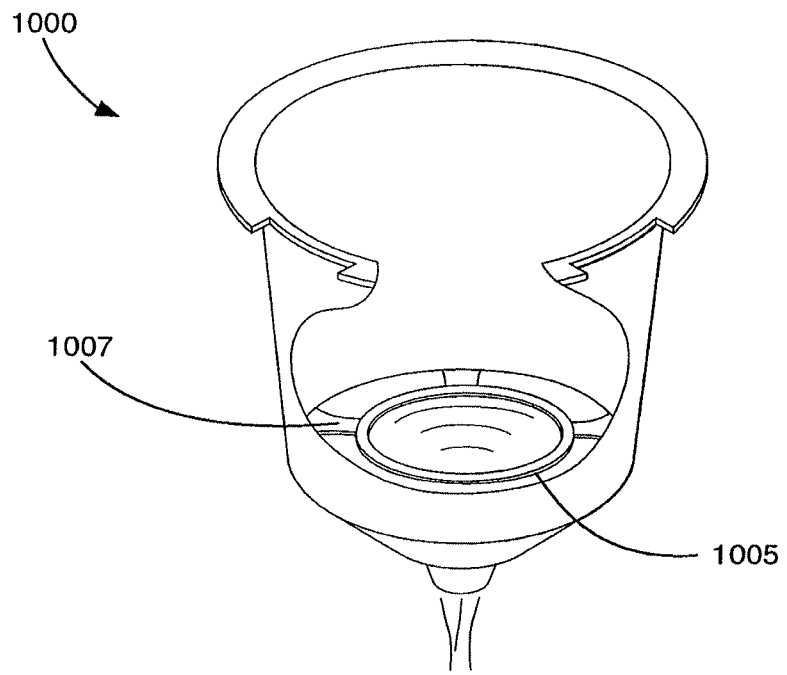
FIG. 10A illustrates an exemplary cartridge with an annular ring used in connection with the beverage basket of FIG. 9A.
Figure 10B:
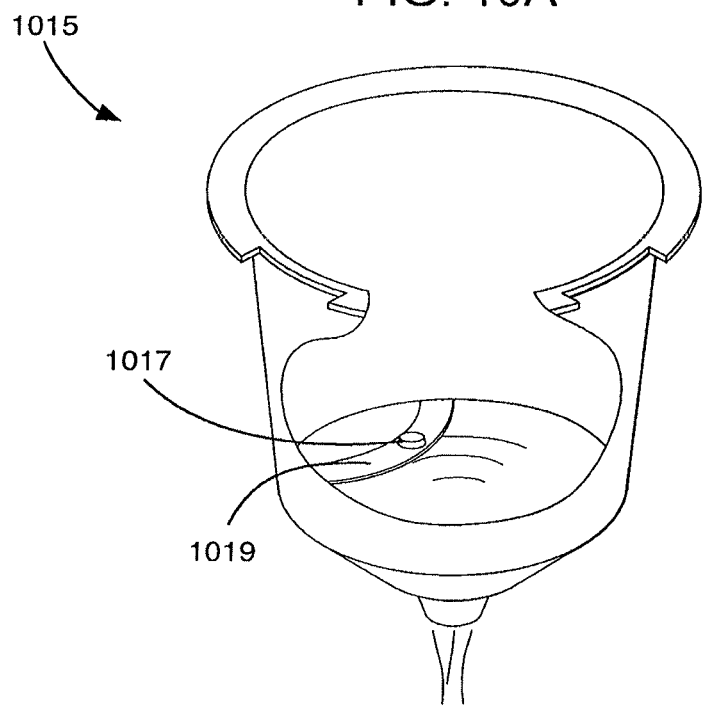
FIG. 10B illustrates an exemplary cartridge with a button used in connection with the beverage basket of FIG. 9B.

FIG. 10A and FIG. 10B, illustrate exemplary cartridges 1000 and 1015 with alignment features. The same alignment features may be provided in a brewer independently of a cartridge. Referring to FIG. 10A, the feature corresponds to an annular ring 1005. The annular ring 1005 may be suspended within the cartridge by one or more bridge members 1007 to facilitate fluid flow around the annular ring 1005. The annular ring 1005 may be sized to fit within the groove 905 of the beverage basket 900. In a brewer implementation, the annular ring 1007 may be formed in a portion of the brewer configured to receive the beverage basket 900. In other implementations, the annular ring 1005 and one or more bridge members 1007 may correspond to a separate component configured to fit substantially near the bottom of the cartridge 1000 or brewer and to maintain a distance between sidewalls of the cartridge 1000 or brewer.

Referring to FIG. 10B, the feature corresponds to a button 1017. The button 1017 may be sized to fit within the indentation 907, described above. The button 1017 may be supported by a bridge member 1019 to enable fluid flow around the button 1017. In a brewer implementation, the button 1017 may be formed in a portion of the brewer configured to receive the beverage basket 900. In other implementations, the button 1017 and bridge member 1019 may correspond to a separate component configured to fit substantially near the bottom of the cartridge 1015 or brewer and to maintain a distance between sidewalls of the cartridge 1015 or brewer.

Figure 11A:
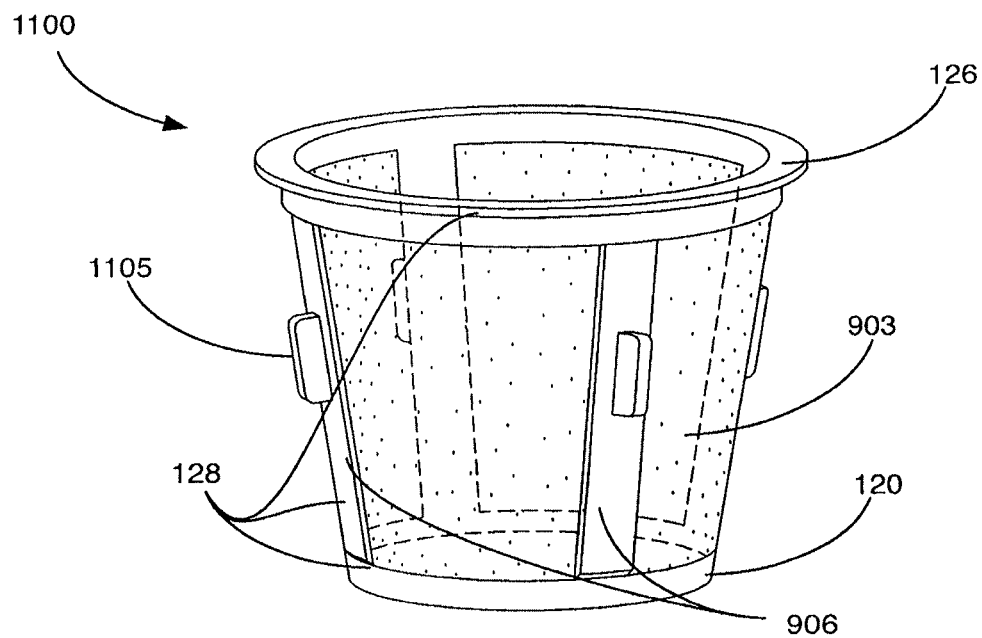
FIG. 11A illustrates a disposable beverage basket with a group of outwardly extending ledges.
Figure 11B:
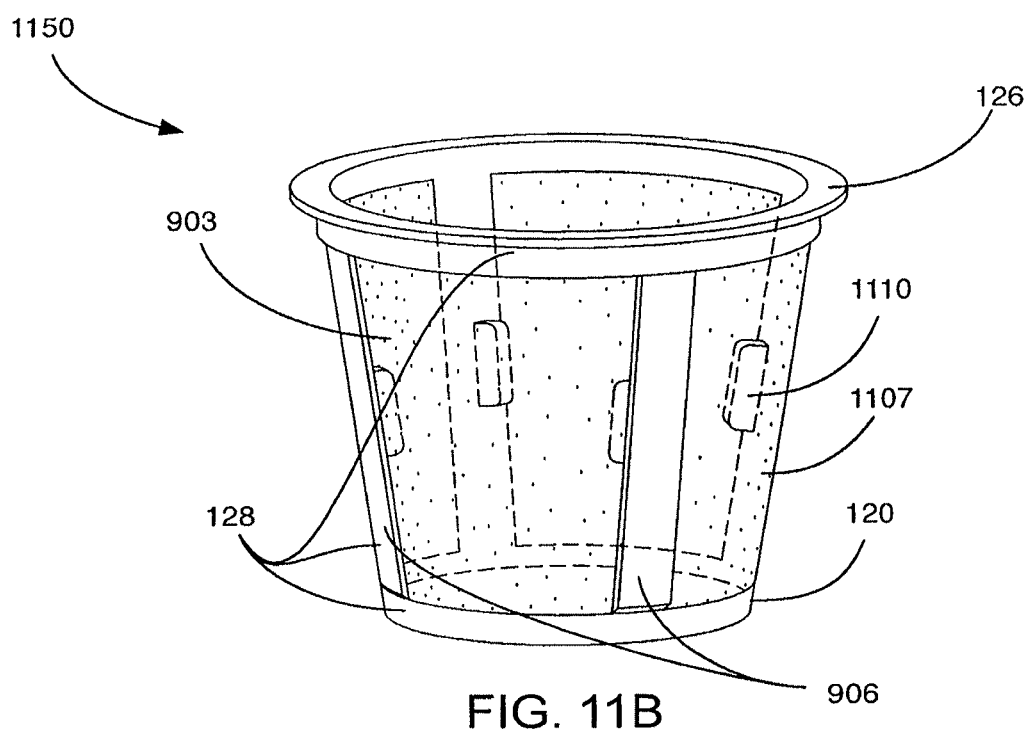
FIG. 11B illustrates a disposable beverage basket with a group of inwardly extending ledges.

FIG. 11A and FIG. 11B illustrate beverage basket embodiments 1100 and 1150 configured to be stacked. Referring to FIG. 11A, the beverage basket 1100 includes a frame 128 and filter material 903, as described above. For example, the frame includes a rim 126, a bottom portion 120, and a group of ribs 906. The rim 126 defines an opening that corresponds to the top a top of the frame 128. The rim 126 may be continuous and have a circular shape, oval shape, or a different shape. The bottom portion 120 is a closed surface that corresponds to the bottom of the frame 128. The ribs 906 extend from the rim 126 to the edge of the bottom portion 120. The ribs 906, rim 126, and bottom portion 120 define a group of openings that facilitate fluid flow, such as coffee, tea, or a different beverage.

Each rib 906 includes a ledge 1105 and 1110 (FIG. 11A) positioned in a center region. The ledges 1105 and 1110 are configured to limit an amount by which respective baskets 1100 and 1150 are insertable into one another. Limiting the insertion amount results in a space 1210 (FIG. 12B) between respective bottoms 120 of the baskets 1100 and 1150. The space 1210 may be sized to facilitate storage of beverage grounds, such as coffee ground, tea grounds, or other grounds, which the baskets 1100 and 1150 are stacked. That is, the position of the ledges 1105 and 1210 along the ribs 906 may be configured to result in a desired amount of space 1210 between respective baskets. Thus, several baskets may be advantageously filled with grounds and then stacked to save space.

Figure 12A:
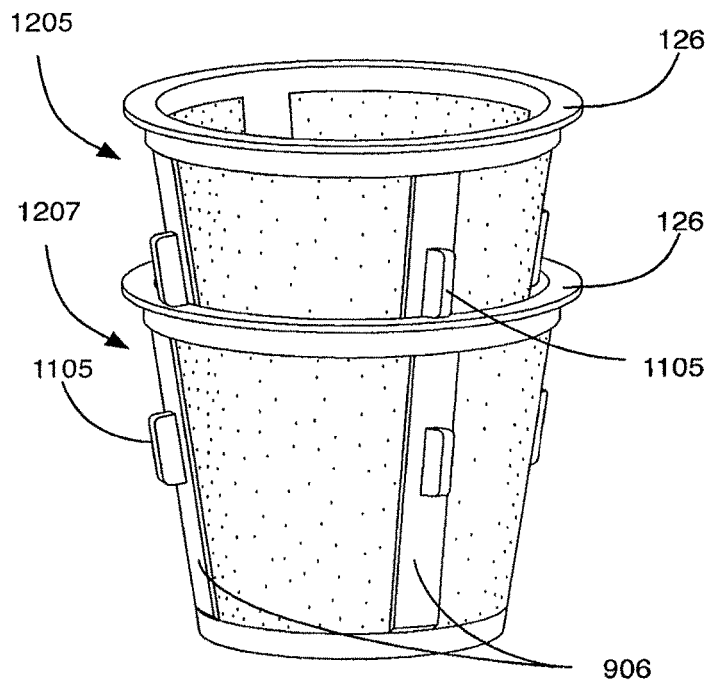
FIG. 12A illustrates stacking of disposable beverage baskets that include outwardly extending ledges.

In some configurations, the ledge 1105 extends outwardly away from the center of the basket. (See FIG. 11A). Referring to FIG. 12A, in this configuration, the ledge 1105 of a top basket 1205 rests upon the rim 126 of a lower basket 1207. In this regard, the distance between opposing ledges 1105 (i.e., ledges 1105 on opposite sides of the basket 1100) may be equal to about the inner diameter of the rim 126.

Figure 12B:
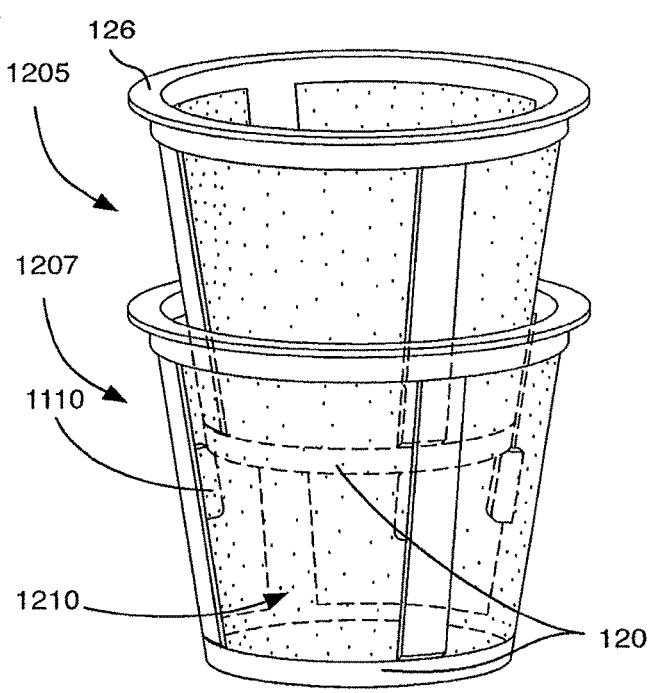
FIG. 12B illustrates stacking of disposable beverage portion baskets that include inwardly extending ledges.

In other configurations, the ledge 1110 extends inwardly towards the center of the basket. (See FIG. 11B). Referring to FIG. 12B, in this configuration, the bottom portion 120 of the top basket 1205 rests upon the ledge 1110 of the lower basket 1207. In this regard, the distance between opposing ledges 1110 (i.e., ledges 1105 on opposite sides of the basket 1100) may be equal to about the outer diameter of the bottom portion 120.

Figures 13A, 13B:
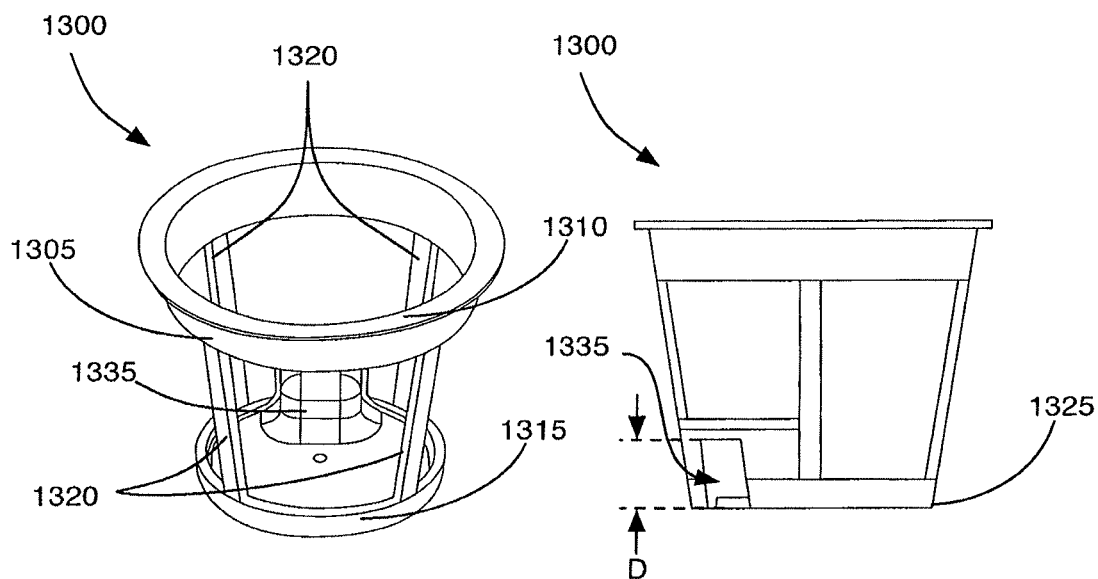
FIGS. 13A-13C illustrate perspective, side, and bottom views, respectively, of yet another beverage basket embodiment.
Figure 13C:
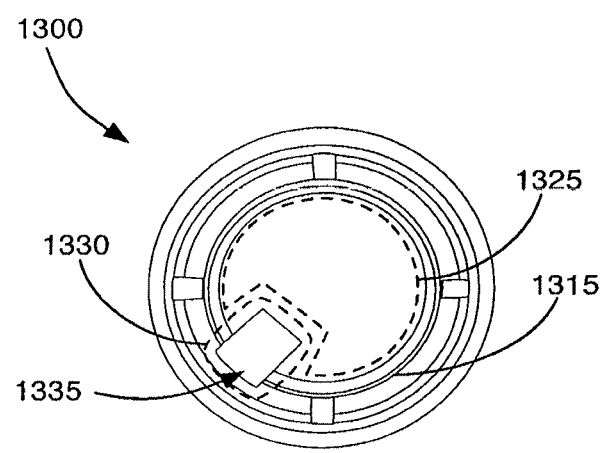

FIGS. 13A-13C illustrate perspective, side, and bottom views, respectively, of yet another beverage basket embodiment 1300. The beverage basket 1300 is configured to be placed into a brewer (not shown) without the need for a cartridge 400. Such brewers typically include a receiving member sized to receive a basket with a similar although not identical shape. A protruded membrane-piercing needle is positioned in the lower portion of the receiving member and is configured to pierce the lower portion of a typical plastic cup (e.g., a generally cylindrically shaped cup with a flat and closed bottom surface) so as to facilitate fluid flow out of the basket, through the needle, and then into a cup.

The beverage basket embodiment 1300 includes a frame 1305. The frame 1305 includes a rim 1310, a bottom portion 1315, and a group of ribs 1320. The rim 1310 defines an opening that corresponds to the top of the frame 1305 when the frame 1305 is in an upright position. The rim 1310 may be continuous and have a circular shape, oval shape, or a different shape. The bottom portion 1315 is a closed surface that corresponds to the bottom of the frame 1305. The ribs 1320 extend from the rim 1310 to the edge of the bottom portion 1315. The ribs 1320, rim 1310, and bottom portion 1315 define a group of openings that facilitate fluid flow, such as coffee, tea, or a different beverage. The beverage basket embodiment 1300 also includes a filter material that covers the openings, such as any of the filter materials described above, which is not shown in this instance for clarity.

A first portion 1325 (FIG. 13C) of the bottom portion 1315 is substantially flat. Whereas a second portion 1330 of the bottom portion 1315 defines an indentation 1335, which can be either fully enclosed or semi enclosed. The first portion 1325 may occupy % or more of the surface area of the bottom portion 1315. The second portion 1330 may occupy the remaining area. The indentation 1335 is sized so that when the basket 1300 is inserted into the receiving member, the membrane-piercing needle fits within the indentation 1335 and does not pierce the bottom portion 1315. For example, a depth D of the indentation 1335 relative to the lower surface of first portion 1325 of the bottom surface may be, for example but not limited to, about 0.388 inches. The width of the indentation 1330 may be, for example but not limited to, about 0.287 inches, and the indentation 1335 may be offset towards a side edge of the bottom portion 1315, which corresponds to the location of the membrane-piercing needle in some brewer implementations. However, the indentation 1335 may be located in a different location when the membrane-piercing needle is positioned differently. Limiting the space occupied by the indentation 1335 (i.e., maximizing the space occupied by the first portion) results in more space within the basket 1300 for grounds, such as coffee grounds. This in turn facilitates the production of stronger blends.

FIGS. 14A-14B illustrate various exemplary lids for covering the beverage basket embodiment 1300. The respective lids are configured to selectively substantially seal the opening defined at the top of the frame 1305. FIGS. 14A and 14B illustrate a first exemplary lid 1400. The lid 1400 includes an opening 1402 in a center region through which a liquid flows into the basket 1300. The lid 1400 also includes an annular ring 1405 configured to be friction fit against an inner surface of the rim 1310 of the frame 1305 to thereby form a seal between the lid 1400 and the beverage basket 1300. That is, a seal between the outer surface of the annular ring 1405 and the inner surface of the rim 1310. The diameter of the annular ring 1405 may be sized to provide a tight fit between the lid 1400 and the basket 1300 while still facilitating removal of the lid 1400.

FIGS. 15A and 18 illustrate a second exemplary lid 1500. The lid 1500 includes an opening 1502 in a center region through which a liquid flows into the basket 1300. The lid 1500 includes a sidewall 1505 configured to be snap fit over an outer edge of the rim 1310. In other words, the seal between the lid 1500 and the beverage basket 1300 is formed between the inner surface of the sidewall 1505 and the outer surface of the rim 1310. The diameter of the sidewall 1505 may be sized to provide a tight fit between the lid 1500 and the basket 1300 while still facilitating removal of the lid 1500.

Figures 16A, 16B:
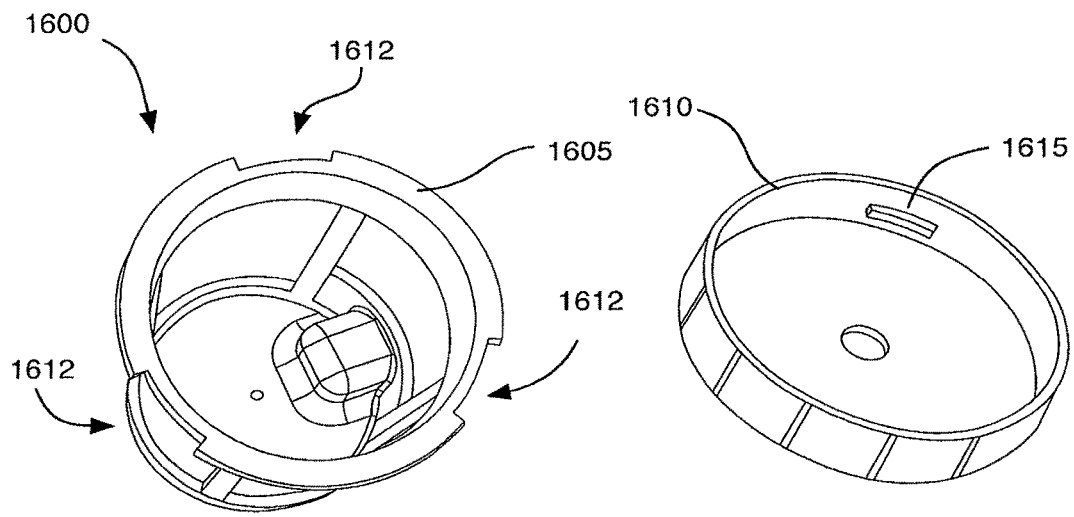
FIGS. 16A and 16B illustrate a basket and lid that twist lock together.

FIGS. 16A and 16B illustrate another exemplary beverage basket 1600 and lid 1610. The beverage basket 1600 includes the features of the beverage basket 1300 described above. However, the rim 1605 defines one or more cutouts 1612. The lid 1610 includes one or more tracks 1615 configured to cooperate with the one or more cutouts 1612 to facilitate twist locking of the lid 1610 to the beverage basket 1600. In this regard, the thickness of the rim 1605 may gradually increase with a distance away from the cutouts 1612 so that the tightness between the lid 1610 and the beverage basket 1600 increases with further twisting of the lid 1610.

Figure 17:
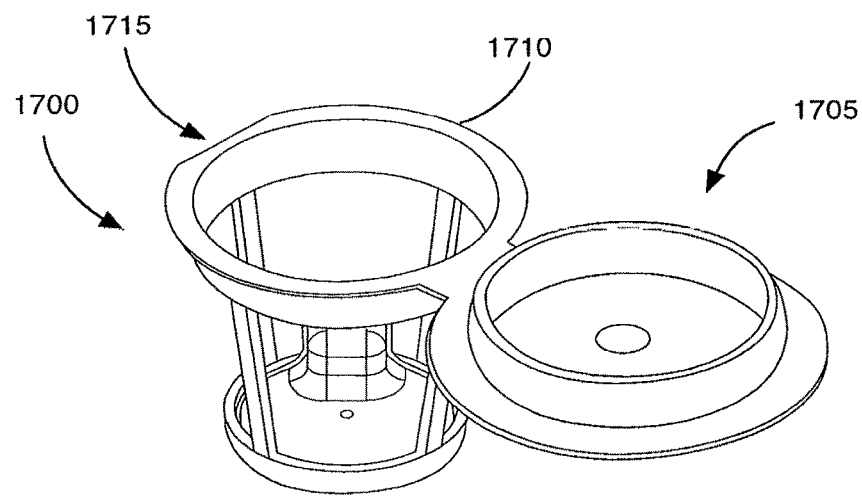
FIG. 17 illustrates a basket and lid formed together.

The configurations above may be varied. For example, as illustrated in FIG. 17, the basket 1700 and lid 1705 shown in FIG. 14 may be formed together so that in an open configuration the lid 1705 is attached to the basket 1700. The lid 1705 may then be folded over the basket 1700 to close the top opening of the basket 1700 defined by the rim 1710. A cutout 1715 may be formed in the rim 1710 to expose an underside of the lid 1705 when the lid 1400 is in the closed configuration. The cutout 1715 facilitates removal of the lid 1705 from the basket 1700.

Figure 18A:
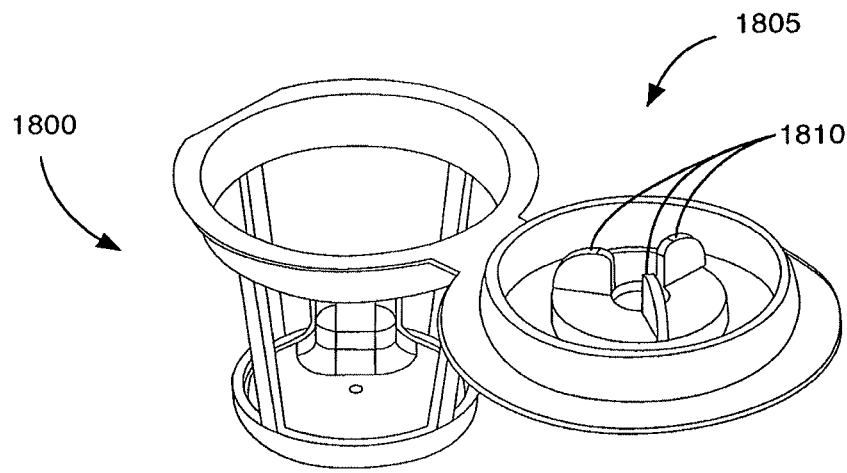
FIGS. 18A and 18B illustrate liquid distribution fins positioned on a lower surface of an exemplary lid.
Figure 18B:
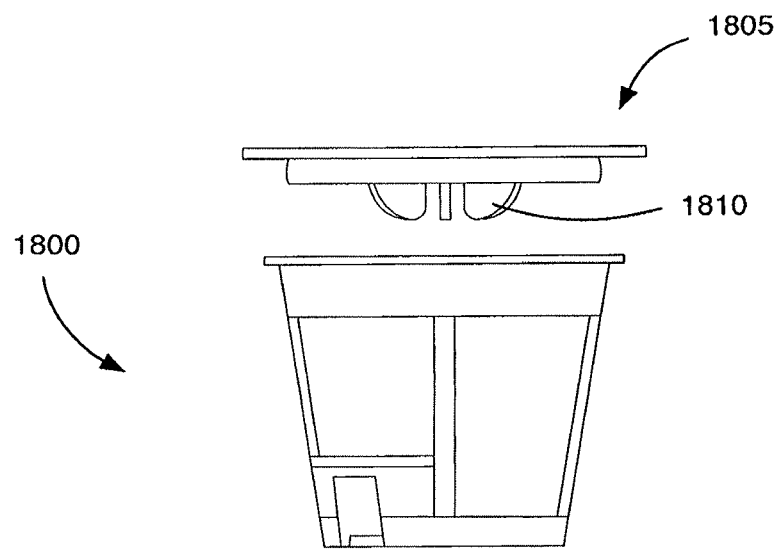

As illustrated in FIGS. 18A and 18B, liquid distribution fins 1810 may be formed on the underside of the lid 1805. During operation, liquid flowing into the lid opening will, through capillary pressure, be drawn over the liquid distribution fins 1810 and then drop onto the grounds in the basket 1800. The liquid distribution fins 1810 distribute the liquid over a larger portion of the grounds in the basket 1800 than would occur without the use of fins 1810. This in turn facilitates more even brewing of the beverage. It is understood that the shape and number of fins 1810 are only exemplary.

Accordingly, it will be apparent to those of ordinary skill in the art that many more embodiments and implementations are possible that are within the scope of the claims. Therefore, the embodiments described are only provided to aid in understanding the claims and do not limit the scope of the claims.

We claim:

1. A beverage brewer, comprising:
   (A) a cartridge configured for holding a disposable, single-use filter basket, the cartridge having an opening in a bottom portion;
   (B) a disposable single-use filter basket placed and disposed within the cartridge of the brewer,
   (1) the filter basket comprising
   (a) a frame made of a plastic, and comprising: a continuous, circular top rim that defines a top opening of the frame; a circular bottom; and a plurality of spaced apart ribs that extend from the top rim to a peripheral edge of the circular bottom, wherein the peripheral edge of the circular bottom, the plurality of ribs, and the top rim define a plurality of side openings, the frame having a generally cylindrical profile with a tapered shape; and
   (b) a flexible, liquid-permeable non-woven filter medium insert that has a same tapered profile as that of the frame, the non-woven filter medium insert inherently formed of random, interconnected fibers forming disordered inlet and outlet fluid passageways, the non-woven filter medium insert being separately formed from the same plastic as the frame, wherein the non-woven filter medium insert is sized such that the plastic of the frame, including the circular bottom peripheral edge, the plurality of ribs, and the top rim, is dispersed into and around the fibers of the non-woven filter medium insert along locations where the non-woven filter medium insert contacts the frame such that the circular bottom including the peripheral edge, the plurality of ribs, the circular top rim, and the non-woven filter medium insert comprise a unity structure, whereby the non-woven filter medium insert covers the plurality of side openings so as to define a beverage grounds receptacle area that is in communication with the top opening;
   wherein the circular bottom is closed to prevent passage of water therethrough such that water exits the filter basket only through the non-woven filter medium insert through the plurality of side openings directly into the cartridge;
   (2) an amount of beverage grounds, prefilled and disposed within the filter basket, and
   (3) a cover attached and sealed across the top rim of the frame that covers the top opening of the frame to maintain the beverage grounds within the filter basket, the cover selected from the group consisting of a foil, foil laminate, metalized film, coated film or multilayer laminate EVOH film, polyethylene film, thermoplastic starch film, plastic film, and barrier plastic film, and laminates and composites thereof; and
   (C) an inlet probe configured to pierce the cover and to admit a heated liquid into the filter basket to interact with the beverage grounds and create a brewed beverage;
   wherein the brewed beverage flows through the non-woven filter medium insert covering the plurality of side openings and exits through the opening in the bottom portion of the cartridge.

2. The beverage brewer according to claim 1, wherein the cartridge includes a sidewall that is spaced apart from the plurality of side openings of the filter basket.

3. The beverage brewer according to claim 1, wherein the brewer further includes a piercing needle in the bottom of the cartridge of the brewer, and wherein the circular bottom of the filter basket includes a feature selected from the group consisting of a groove or an indentation that cooperates with the piercing needle to control positioning of the filter basket within the cartridge.

4. The beverage brewer according to claim 1, wherein the non-woven filter medium insert is made of a recyclable or compostable plastic, and the frame is made out of the material of the non-woven filter medium insert.

5. The beverage brewer according to claim 4, where the frame is made of polypropylene, and the non-woven filter medium insert is made of polypropylene.

6. The beverage brewer according to claim 4, where the frame is made of polylactic acid, and the non-woven filter medium insert is made of polylactic acid.

7. The beverage brewer according to claim 1, the filter non-woven filter medium insert is attached to the frame through the insert injection molding process, by injecting the plastic material of the frame around the non-woven filter medium insert.

8. The beverage brewer according to claim 1, where the beverage grounds are coffee grounds.

9. The beverage brewer according to claim 1, where the beverage grounds are tea grounds.

10. The beverage brewer according to claim 1, where the filter basket is tapered in shape.

11. A beverage brewer, comprising:
(A) a cartridge configured for holding a disposable, single-use beverage filter basket, the cartridge having an opening in a bottom portion;
(B) a disposable single-use beverage filter basket placed and disposed within the cartridge of the brewer,
  (1) the beverage filter basket comprising
    (a) a frame made of a recyclable or compostable synthetic, natural or bio-based polymer material, comprising: a continuous, circular top rim that defines a top opening of the frame; a circular bottom having a peripheral edge; and a plurality of spaced apart ribs that extend from the top rim to the peripheral edge of the circular bottom, wherein the circular bottom peripheral edge, the plurality of ribs, and the top rim define a frame having a generally cylindrical profile with a tapered shape and which has a plurality of side openings;
    (b) a liquid-permeable non-woven filter medium insert that has a same cylindrical and tapered profile as that of the frame, the filter medium insert made of a recyclable or compostable synthetic, natural or bio-based material inherently formed of random, interconnected fibers, the fibers collectively forming disordered inlet and outlet fluid passageways therethrough, the non-woven filter medium insert being separately formed from the same material as the frame, wherein the material of the frame, including the circular bottom peripheral edge, the plurality of ribs, and the top rim, is dispersed into and around the fibers of the non-woven filter medium insert along locations where the non-woven filter medium insert contacts the frame such that the circular bottom including the peripheral edge, the plurality of ribs, the circular top rim, and the non-woven filter medium insert comprise a unity structure, whereby the non-woven filter medium insert covers the plurality of side openings so as to define a beverage grounds receptacle area that is in communication with the top opening; and
    (c) wherein the circular bottom is closed to prevent passage of water therethrough such that water exits the beverage filter basket only through the non-woven filter medium insert through the plurality of side openings and directly into the cartridge;
  (2) an amount of beverage grounds, prefilled and disposed within the beverage filter basket, and
  (3) a cover attached to the top rim and across the opening at the top of the frame to maintain the beverage grounds within the beverage filter basket; and
(C) an inlet probe configured to pierce the cover and to admit a heated liquid into the beverage filter basket to interact with the beverage grounds and create a brewed beverage.

12. The beverage brewer according to claim 11, wherein the cartridge includes a sidewall that is spaced apart from the plurality of side openings of the filter basket.

13. The beverage brewer according to claim 11, wherein the brewer further includes a piercing needle in the bottom of the cartridge of the brewer, and wherein the circular bottom of the filter basket includes a feature selected from the group consisting of a groove or an indentation that cooperates with the piercing needle to control positioning of the filter basket within the cartridge.

14. The beverage brewer according to claim 11, wherein the non-woven filter medium insert is made of a recyclable or compostable plastic, and the frame is made out of the material of the non-woven filter medium insert.

15. The beverage brewer according to claim 14, where the frame is made of polypropylene, and the non-woven filter medium insert is made of polypropylene.

16. The beverage brewer according to claim 14, where the frame is made of polylactic acid, and the non-woven filter medium insert is made of polylactic acid.

17. The beverage brewer according to claim 11, where the non-woven filter medium insert is attached to the frame through an insert injection molding process, by injecting the plastic material of the frame around the non-woven filter medium insert.

18. The beverage brewer according to claim 11, where the beverage grounds are coffee or tea grounds.

19. The beverage brewer according to claim 11, where the beverage filter basket is tapered in shape.

* * * * *